Dec. 11, 1934.  M. ARAUJO  1,983,961
DEVICE FOR PERFORMING TRIGONOMETRICAL CALCULATIONS
Original Filed Aug. 18, 1928  3 Sheets-Sheet 1
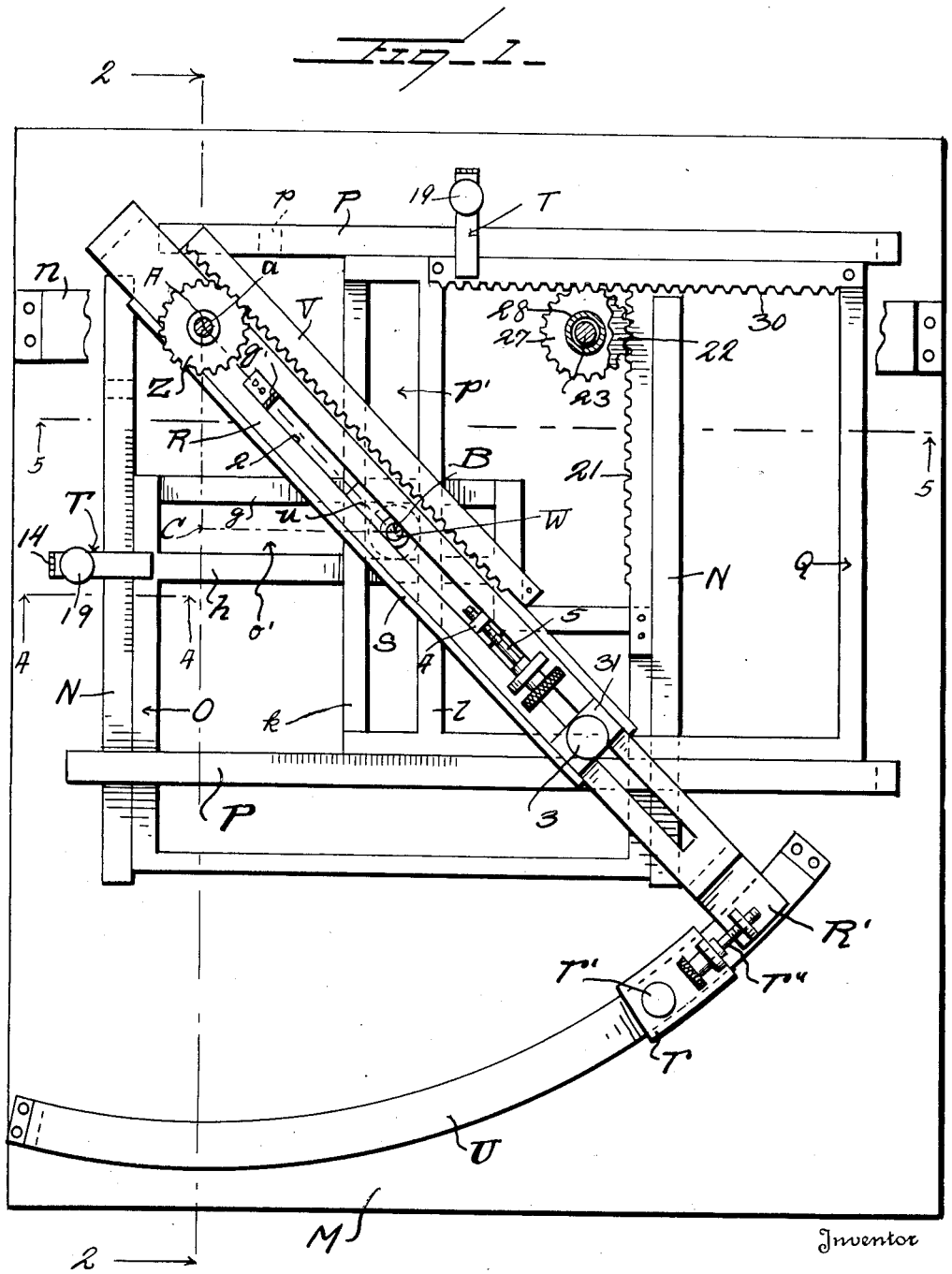

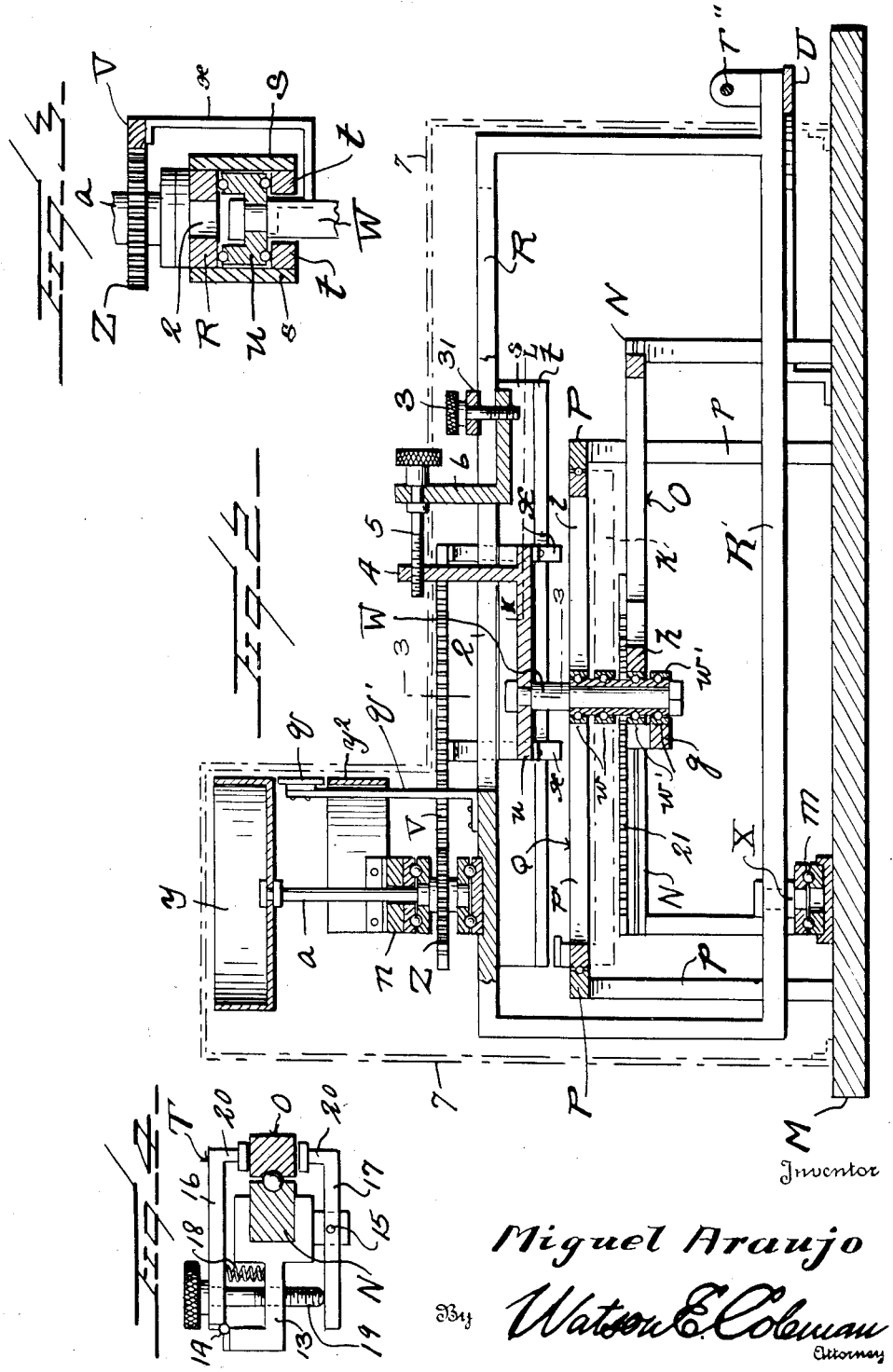

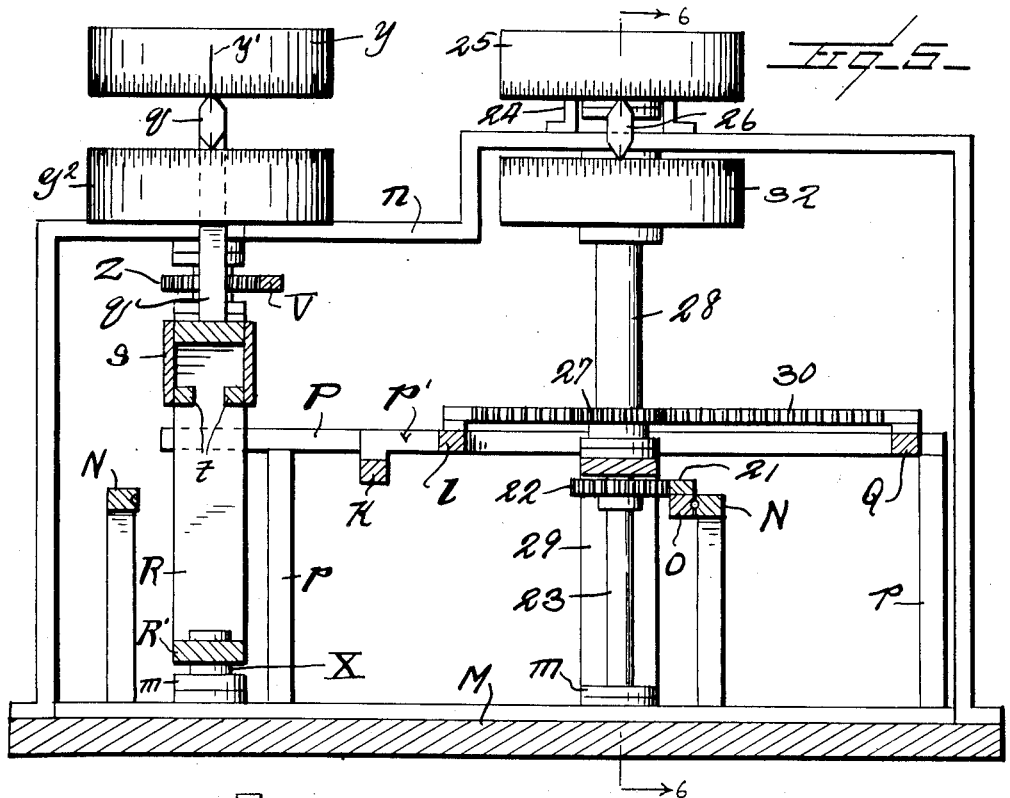
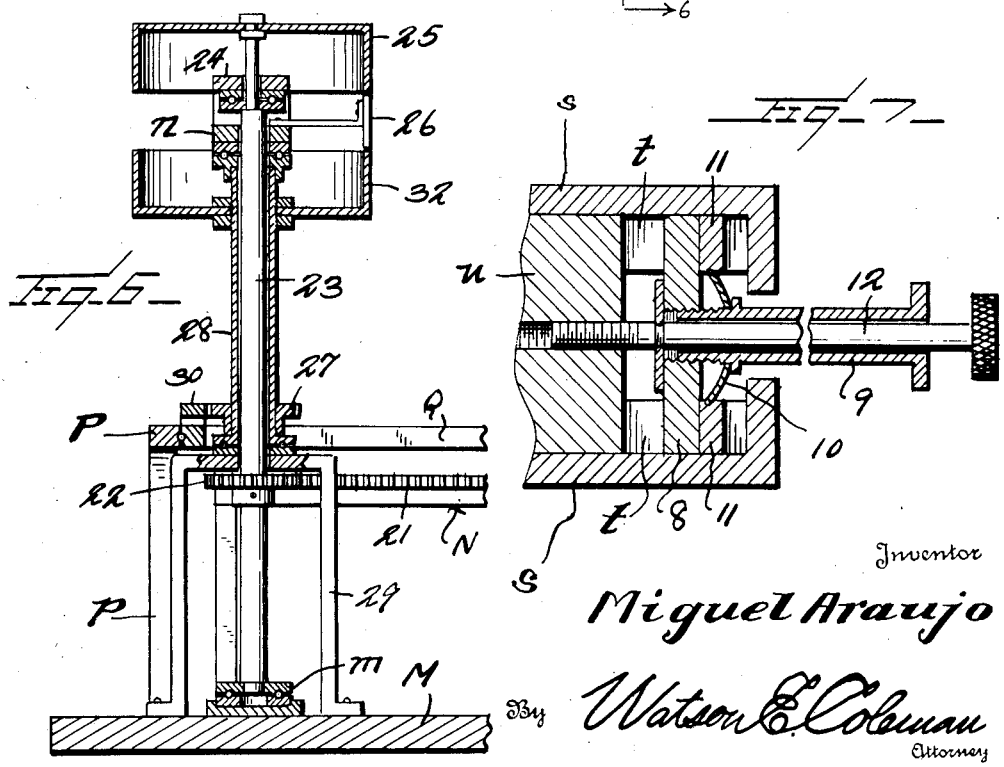

Patented Dec. 11, 1934

1,983,961

UNITED STATES PATENT OFFICE 1,983,961

DEVICE FOR PERFORMING TRIGONOMETRICAL CALCULATIONS

Miguel Araujo, Pachuca, Estado de Hidalgo, Mexico

Refiled for abandoned application Serial No. 300,514, August 18, 1928. This application August 29, 1931, Serial No. 560,249

8 Claims. (Cl. 33—97)

This application is a refile of abandoned application No. 300,514, filed Aug. 18, 1928.

This invention relates to devices for performing certain mathematical calculations and particularly to mechanism for calculating in a quick and simple manner the values of the trigonometrical functions of a given angle having a given length or hypothenuse and secondly for determining the angles and the dimensions of the sides of the triangle when the functions are known. I am aware that heretofore it has been proposed to provide means for accomplishing this general result including a rectangular frame, straight edges disposed at right angles to each other and movable at right angles to each other across said frame and intersecting each other, and a straight edge or blade pivoted to one corner of the frame and intersecting the junction of the first named straight edges or blades. Thus by setting the three straight edges or blades, the functions of any desired angle may be indicated upon scales on the frame and blades or again the functions of the angle may be determined and the dimensions of its several sides may be also determined. The device, as above described, however, could not be satisfactorily used because of three important defects. It lacked accuracy, it was difficult to adjust, and when the triangle to be described was small, it could not be used due to the fact that the slide connecting the three straight edges at their intersection could not by any possibility be moved very close to or approximately coincident with the pivot for the swinging straight edge denoting the hypothenuse of the triangle.

Furthermore, in order to have the necessary graduations or scales on the frame, it was necessary that the device should have relatively large dimensions and this rendered it impracticable to handle.

Bearing these facts in mind, the general object of my invention is to provide novel means for connecting the three straight edges or blades at their intersection which will permit the free movement of these connecting means with relation to the three blades without permitting any unrestricted movement or looseness of said connecting member in the slots.

A further object is to provide a mechanism of this character which may be used for measuring very short distances and specifically to provide means whereby the member connecting the three straight edges at their intersection may be shifted into position beneath or very close to the pivotal point upon which the straight edge indicating the hypothenuse of the triangle is pivoted.

A further object is to provide means whereby without increasing the size of the device, the accuracy of the device may be very greatly increased by the use of micrometric devices for controlling the movement of the element connecting the three straight edges at their intersections.

Other objects will appear in the course of the following description.

My invention is illustrated in the accompanying drawings, wherein:—

Figure 1 is a plan view of the device with the outer cover or casing removed and with the micrometric operating means removed;

Figure 2 is a section on the line 2—2 of Figure 1 but showing the straight edge for indicating the hypothenuse of the triangle disposed on the line 2—2;

Figure 3 is a fragmentary section taken on the line 3—3 of Figure 2, the section, however, not extending below the guides for the spindle carrying slide;

Figure 4 is a section on the line 4—4 of Figure 1;

Figure 5 is a fragmentary vertical section on the line 5—5 of Figure 1 showing the micrometric devices for controlling the shifting of one of the racks;

Figure 6 is a cross section on the line 6—6 of Figure 1, but showing the micrometric devices for controlling two of the racks;

Figure 7 is a horizontal section showing a modified means for micrometrically shifting the slide $u$.

As illustrated in the drawings, I provide a base M. Mounted upon this base upon vertical supports $p$ are the rails or guides P which, as shown in Figure 1, extend transversely across the base or table in spaced relation thereto.

Disposed at right angles to the guides or rails P are the guides or rails N which are supported from the table in spaced relation to the base in any suitable manner but are disposed in a plane below the guides P.

Disposed between the guides P and slidable thereon transversely of the table is a frame designated generally Q, this frame being shown as rectangular in plan and formed to provide the wide slot $p'$. Disposed between the guides N and sliding thereon is the frame O which is also approximately rectangular in form and provided with the slot $o'$ extending transversely of the table and at right angles to the slot $p'$. These slots $o'$ and $p'$ cross each other.

Pivotally mounted upon a spindle $a$ as shown in Figures 1 and 2 is a straight edge or blade R designed to indicate the hypothenuse of any triangle. This blade or straight edge R is mounted upon upper and lower spindles $a$ and X respectively for rotation (see Figure 2). The member R is in vertical section rectangular in form to provide a lower blade R', the free end of which rests on or bears against an arcuate plate U which may or may not be graduated as desired. Means are provided on the arcuate plate U whereby the arm R' may be held in adjusted position upon the arc U and micrometrically adjusted. To this end, the extremity of the member R' is carried by a slide $r$ which has a set screw $r'$ whereby the slide may be held in adjusted positions upon the arcuate member U, this slide $r$ having an upwardly extending lug through which passes an adjusting screw $r''$ engaging in a lug formed on the extremity of the member R. Thus it will be seen that the slide $r$ may be slid along the plate U to any adjusted position, held in adjusted position by the screw $r'$ and then the screw $r''$ be adjusted to adjust the member R in one direction or the other through a very small arc.

This straight edge R or blade is longitudinally slotted for the greater portion of its length as at 2. The spindle X, as shown in Figure 2, is mounted upon ball bearings $m$ carried by the base M. The spindle $a$ is mounted in ball bearings upon the frame $n$ and this spindle $a$ at its upper end carries a head $y$ whereby the spindle $a$ may be rotated.

Mounted upon the spindle $a$ is the gear wheel Z which engages with a rack V extending parallel to the straight edge R. This rack V has members $x$ (see Figures 2 and 3) extending down below the straight edge and carrying a slide $u$ sliding on tracks $t$ mounted on depending portions $s$ which extend down from the member R as shown more clearly in Figure 3. It is obvious, therefore, that if the member $u$ be slid on the tracks $t$ parallel to the median line of the straight edge R, that the member $u$ will shift the rack V to thus rotate the gear wheel Z, rotate the spindle $a$ and rotate the head $y$. This head carries graduations $y'$ which coact with a pointer $q$ on an inner drum $y^2$ carried by a support $q'$ extending upward from the straight edge R. This pointer also coacts with a graduated head $y^2$ which is carried by the fixed frame $n$ and thus the pointer $y^2$ with this graduated head indicates the extent to which the straight edge or blade R is shifted around its pivotal axis. It will thus be seen that as the slide $u$ is shifted along the guides or tracks $t$, the head $y$ will be caused to rotate with reference to the fixed pointer $q$ and thus the amount of rotation will be indicated.

Mounted upon the slide $u$ is a spindle W which at its upper end extends through this slide $u$ and is engaged by a nut. This spindle W extends through the slots $p'$ and $o'$ of the sliding elements or frames O and Q and this spindle W is disposed immediately beneath the slot 2 and, therefore, in alinement with the longitudinal median line of the member R, which median line would intersect the axis upon which the member R rotates.

The opposite rails $l$ and $k$ which define the slot $p'$ are disposed on different levels, as shown most clearly in Figure 5 and the rails $g$ and $h$ which define the slot $o'$ are also disposed on different levels. This is most clearly shown in Figure 2. Mounted upon the spindle W are two rollers $w$ one of which engages with the rail $l$ and the other with the rail $k$ and also mounted upon the spindle to rotate therewith are two rollers $w'$ disposed on different levels which engage with the rails $g$ and $h$. These rollers are mounted upon ball bearings as shown in Figure 2. Thus one of the rollers rotates against one of the rails $g$ while the other roller rotates against the member $h$ of the member Q so that there is no friction against these rollers. They rotate perfectly freely. The ball bearings thus permit these rollers to rotate relative to the frames O and Q without binding and with a minimum of friction and vice versa permit the frames O and Q to be shifted with relation to each other and the element R with a minimum of friction. It will be noted that the construction which I have described permits the slide $u$ to be shifted so that the spindle W may be disposed in alinement with the axis of the spindle $a$ upon which the straight edge R rotates.

In order to provide for a micrometric adjustment of the slide $u$, I form the lug 4 on the slide and slidingly mount upon the straight edge the member 6 which is held in place by a set screw 3 extending downward through a clamping bar 31 and extending into the angular lower end of the member 6. This member 6 carries a finely threaded adjusting screw 5 which passes through the upper portion of the member 6 and passes through the portion 4. If the clamp screw 3 be released so that the member 6 is free to slide, it is obvious that a rotation of the gear wheel Z through the spindle $a$ will shift the slide $u$ and the member 6 longitudinally of the slot 2 or these parts may be shifted by hand to the correct distance.

Then by clamping the member 6 to the straight edge R, the screw 5 may be used to shift the member $u$ longitudinally and with delicacy and accuracy, this shifting of the member $u$, of course, being transmitted through the parts to the rack V, thus to the gear wheel Z, thus to the spindle $a$ and finally to the head $y$ whose graduations may be read with regard to the pointer $q$.

The frames O and Q may be held in adjusted position, after having been adjusted, by means of the clamping device shown in Figure 4. Figure 4 is a section on the line 4—4 of Figure 1, but the means for clamping the frame O to the guide N is exactly the same as the means for clamping the frame Q to the guide P. Therefore, a description of one will suffice for the other. As shown in Figure 4, embracing the guide N is a member 13 which is angularly bent upward at its outer end and hinged thereto at 14 is a member 16 having a foot 20. A spring 18 urges the member 16 upward and its foot 20 away from the frame O. Pivoted upon the member 13 at 15 is a lever 17 carrying a second foot 20 bearing against the under side of the member O and extending through the member 16 is an adjusting screw 19 which bears against the adjacent end of the lever 17. Therefore, when this screw is turned in one direction, it will force the members 16 and 17 toward each other and clamp the frame O with relation to the graduated guide N and when it is turned in the other direction a spring 18 will act to urge the members 16 and 17 away from each other. By means of these clamping devices which are designated generally T, the frames O and Q may be held in any adjusted position and when the clamping devices are released the frames can be shifted with relation to each other and relative to the straight edge R.

For the purpose of indicating the degree of rotation of the blade R, I have provided an arcuate graduated head which coacts with the pointer $q$, this pointer being carried upon the straight edge of blade R while the graduated head $y^2$ is mounted upon the frame.

For the purpose of shifting the frame O, I provide this frame with a rack 21 which is mounted upon a rack 21.

Engaging with this rack is a gear wheel 22, which is mounted upon shaft 23, which in turn is mounted upon ball bearings $m$ carried by the base M. The upper end of this shaft carries upon it a graduated head 25 coacting with the pointer 26 mounted upon the frame $n$ which supports this shaft. For the purpose of shifting the frame Q, I provide a tubular shaft 28 which surrounds the shaft 23 and which carries upon it the gear wheel 27 meshing with the rack 30 which is mounted upon the frame O. Upon this tubular shaft is mounted the graduated head 32 which also coacts with the pointer member 26. This tubular shaft is mounted in ball bearings in the frame $n$ and the bearing member 24 and the upper end of the shaft 23 is also mounted in ball bearings in the frame members $m$ and on a support 24. Thus these two shafts are entirely independent of each other and if it be desired to shift the frame O, the head 25 is turned and if it be desired to shift the frame Q, the head 32 is turned or vice versa, when these frames are shifted in one direction or the other, the heads 25 and 32 will be turned to indicate the amount of this shift.

While in Figure 2 I have illustrated the means for securing a fine adjustment of the slide $u$ as comprising the members 4, 5, 6 and 3, yet this construction, of course, prevents the casing 7 from being disposed over the entire upper portion of the mechanism and housing it. For stationary machines or cabinet machines, this does not matter so much but for medium sized machines which are intended to be portable the housing 7 is a necessary element in order to protect them. Therefore, in these medium sized or portable machines, I provide preferably another means whereby the member U may be adjusted delicately or finally. This is shown in Figure 7 which is a horizontal section on the line K—L in Figure 2.

In this case, there is disposed between the guides $s$ a slide 8 which carries a bushing 9. Surrounding this bushing is a plate spring 10, the bushing having an annular rib bearing against this spring. This spring in turn bears against two laterally disposed members 11. When the bushing 9 is forced inward, these members 11 will be forced toward the guides and into clamping engagement therewith to thus hold the bushing and slide 8 firmly in place in adjusted position in the guides $s$. Passing through the bushing is a screw 12 which has screw-threaded engagement with the slide. The relative length of the parts is not shown in Figure 7 which is diagrammatic in character to merely show that such a connection may be made. By this means, when the bushing 9 is retracted so as to release the members 11 from their frictional engagement with the members $s$, the slide 8 and the slide U may be pushed manually longitudinally along the guides S and over the tracks $t$. Then the bushing 9 may be screwed into slide 8 which will compress the spring 10 and force the members 11 into frictional engagement with the guides $s$ and when this has been done, the screw 12 may be turned to secure a fine adjustment of the slide $u$.

It will be seen that with the mechanism described, the frames O and Q may be adjusted in directions at right angles to each other by hand and then locked in their adjusted positions. This, of course, will shift the member R so that the member R will describe the hypothenuse of the triangle A, B, C, and then these elements O and Q may be locked in their adjusted position by the locking means T and the arm or straight edge R may be locked in its adjusted position by the set screw $r'$ and the screw $r''$.

It will also be noted that when these parts are adjusted manually that the several racks 21, 30 and V will be shifted which will shift the heads $y$, 25 and 32 which will thus indicate in graduations, the extent to which these parts have been shifted or vice versa. Thus the dimensions of the triangle A, B, C will be indicated by the graduations on the dials or on the straight edge and vice versa the dimensions being known, these parts may be set to define any desired right angle triangle.

It will likewise be seen that the adjustment of these three elements O, Q and R is secured in the first place by what may be termed a coarse adjustment and then by a fine adjustment and that these adjustments are micrometrically indicated on heads or dials. It will further be noted that the spindle W which forms the point of engagement between the element R and the elements O and Q may be adjusted from a position distanced from the rotative axis of the element R into a position coincident therewith for the reason that the slide U which carries the member W slides beneath the overhanging portion of the arm or straight edge R. It will likewise be noted that the frames O and Q are mounted in the ball bearings in the guides P and N and that ball bearings are disposed between the rollers which engage the frames O and Q and the spindle W so as to reduce all possible friction to a minimum.

I claim:—

1. A device of the character described including a pair of parallel guides extending in one direction, a pair of parallel guides extending at right angles to the first named guides, a rectangular frame movable in one direction between the first named guides, a rectangular frame movable at right angles to the first named frame and between the second named guides, each of the frames having a slot extending transversely of its path of movement, said frames together defining two sides of a rectangle, a straight edge pivoted on a line intersecting the corners of the rectangle partly defined by said frames and extending across the intersection of said slots, said straight edge being longitudinally slotted, means operatively connecting the two frames and the straight edge at the intersection of said slots and permitting free movement of all of the said elements with relation to each other, and rotatable graduated heads, one for each of said frames and one for the straight edge, the first named heads indicating the extent of movement of the frames in one direction or the other, the last named head indicating the movement of the means connecting the straight edge with the frames longitudinally of the straight edge, said means permitting the heads to be used for adjusting the frames.

2. In a device of the character described, a base, a member extending transversely across the base and mounted upon the same for movement at right angles to its length, a second member extending across the base and at right angles to the first named member and mounted for movement parallel to the first named member, both of said members being longitudinally slotted, a straight edge pivotally mounted at one end and extending diagonally across the base and being slotted, means connecting said straight edge at its intersection with the slots to said first named members and permitting free movement of the straight edge and members, said connecting means being longitudinally movable along the straight edge and being movable into a position beneath the axial center of the straight edge, racks, one for each of said members, graduated heads, one for each of said members, and gear wheels controlled by said heads and engaging the respective racks, and means for indicating the degree of rotation of the straight edge around its pivot.

3. In a device of the character described, a base, a pair of guides mounted upon the base and extending in one direction, a pair of guides mounted upon the base and extending at right angles to the first named guides, a rectangular frame mounted between the first named guides and movable longitudinally of the base, a rectangular frame mounted between the second named guides and movable transversely of the base, the frames having intersecting slots, means on the guides for clamping the frames in adjusted positions, a straight edge operatively pivoted upon the base and extending over said frames and being longitudinally slotted, a spindle operatively carried upon the straight edge for longitudinal movement with reference to said slot and having anti-frictional engagement with the walls of the slots in the frames, and means on the base for clamping the straight edge in adjusted positions.

4. In a device of the character described, a base, a pair of guides extending longitudinally of the base, but elevated with reference thereto, a pair of guides extending transversely of the base and at right angles to the first named guides elevated with reference to the base, but disposed above the first-named guides, frames having sliding movement between said guides, one frame being longitudinally movable with relation to the base and the other transversely movable with relation thereto, both of said frames having intersecting slots, said frames together defining two sides of a rectangle, means for micrometrically shifting said frames in their respective directions of travel, an element having a straight edge disposed above said frames and having an arm disposed below the frames, said element being pivotally mounted on pivot members disposed above and below the frames, the pivot being on a diagonal line intersecting the corners of the rectangle partly defined by said guides and the pivot including an upwardly extending spindle which is independently rotatable with relation to the straight edge, the straight edge being longitudinally slotted, guides carried upon the straight edge and depending from the same, a slide mounted upon said guides and shiftable into a position beneath the pivotal end of the straight edge and carrying a spindle extending downward through the intersection of the slots in the frames, a rack disposed above and extending parallel to the straight edge and operatively connected to the slide, a gear wheel mounted upon the first named spindle and engaging said rack and a graduated head mounted upon this last named spindle whereby the amount of longitudinal movement of the rock may be indicated by said graduated head.

5. In a device of the character described, a base, a pair of guides extending longitudinally of the base, but elevated with reference thereto, a pair of guides extending transversely of the base and at right angles to the first named guides elevated with reference to the base, but disposed above the first named guides, frames having sliding movement between said guides, one frame being longitudinally movable with relation to the base and the other transversely movable with relation thereto, both of said frames having intersecting slots, said frames together defining two sides of a rectangle, means for micrometrically shifting said frames in their respective directions of travel, an element having a straight edge disposed above said frames and having an arm disposed below the frames, said element being pivotally mounted on pivot members disposed above and below the frames, the pivot being on a diagonal line intersecting the corners of the rectangle partly defined by said sliding frames and the pivot including an upwardly extending spindle which is independently rotatable with relation to the straight edge, the straight edge being longitudinally slotted, guides carried upon the straight edge and depending from the same, a slide mounted upon said guides and shiftable into a position beneath the pivotal end of the straight edge and carrying a spindle extending downward through the intersection of the slots in the frames, a rack disposed above and extending parallel to the straight edge and operatively connected to the slide, a gear wheel mounted upon the first named spindle and engaging said rack and a graduated head mounted upon this last named spindle whereby the amount of longitudinal movement given to the rack may be indicated on said graduated head, a member mounted upon the straight edge for sliding movement with relation thereto, means for clamping the member to the straight edge or releasing it therefrom, and a finely threaded screw carried by the last named member and operatively engaging the slide whereby to secure a fine adjustment of said slide.

6. In a device of the character described, parallel guides, a frame slidable between said guides and slotted perpendicularly to the guides, a second frame slidable between guides at right angles to the first named frame and slotted at right angles to the slot of the first named frame, the slots of the two frames intersecting, a longitudinally slotted, pivoted straight edge extending over the two frames, a slide mounted upon the straight edge, a spindle carried by the slide and extending downward through the intersection of the slots in the frames, the walls defining the slot in each frame being vertically off-set with relation to each other, and said spindle carrying two anti-friction rollers, one for each of these walls in each frame, one of the rollers engaging one wall of the slot and the other roller engaging the off-set wall of the slot.

7. An instrument of the character described, including two slides movable in directions at right angles to each other, one slide being disposed above the other, the slides together defining two sides of a rectangle, rotatable graduated heads operatively connected to the slides to shift them, the graduations on the heads indicating the extent of movement given to the slides, a pivoted blade, the pivotal axis of which is disposed on a diagonal line intersecting opposed corners of the rectangular figure partly defined by the slides, an element having sliding engagement with the blade and slidingly engaged with both of the slides, a rotatable graduated head operatively connected to the element to shift it longitudinally of the blade, and means for indicating the angular movement of the blade from an initial position.

8. A device of the character described including a pair of parallel guides extending in one direction, a pair of parallel guides extending at right angles to the first named guides, a rectangular frame movable in one direction between the first named guides, a rectangular frame movable at right angles to the first named frame and between the second named guides, each of the frames having a slot extending transversely of its path of movement, said slides together defining two sides of a rectangle, a straight edge pivoted on a line intersecting the opposed corners of the rectangular figure defined by the sliding frames and extending across the intersection of said slots, said straight edge being longitudinally slotted, means operatively connecting the two frames and the straight edge at the intersection of said slots and permitting free movement of all of the said elements with relation to each other, rotatable graduated heads, one for each of said frames and one for the straight edge, the first named heads indicating the extent of movement of the frames in one direction or the other, the last named head indicating the movement of the means connecting the straight edge with the frames longitudinally of the straight edge.

MIGUEL ARAUJO.